United States Patent
Zhu et al.

(10) Patent No.: US 12,413,819 B2
(45) Date of Patent: Sep. 9, 2025

(54) VIDEO PLAYBACK METHOD AND APPARATUS, COMPUTER DEVICE, AND STORAGE MEDIUM

(71) Applicant: Tencent Technology (Shenzhen) Company Limited, Shenzhen (CN)

(72) Inventors: Kongkang Zhu, Shenzhen (CN); Dafeng Luo, Shenzhen (CN); Yaochi Li, Shenzhen (CN); Xiaomeng Ma, Shenzhen (CN); Yiyang Li, Shenzhen (CN); Lu Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 112 days.

(21) Appl. No.: 17/963,863

(22) Filed: Oct. 11, 2022

(65) Prior Publication Data

US 2023/0045363 A1 Feb. 9, 2023

Related U.S. Application Data

(63) Continuation of application No. PCT/CN2021/108308, filed on Jul. 26, 2021.

(30) Foreign Application Priority Data

Sep. 11, 2020 (CN) .......................... 202010956362.3

(51) Int. Cl.
*H04N 21/472* (2011.01)
*H04N 21/431* (2011.01)
*H04N 21/482* (2011.01)

(52) U.S. Cl.
CPC ... *H04N 21/47217* (2013.01); *H04N 21/4316* (2013.01); *H04N 21/4825* (2013.01)

(58) Field of Classification Search
None
See application file for complete search history.

(56) References Cited

U.S. PATENT DOCUMENTS

| 2011/0154405 | A1 | 6/2011 | Isaias | |
|---|---|---|---|---|
| 2018/0014066 | A1* | 1/2018 | Berman | H04N 21/439 |
| 2018/0376216 | A1* | 12/2018 | Zhou | H04N 21/44016 |

(Continued)

FOREIGN PATENT DOCUMENTS

| CN | 103916718 A | 7/2014 |
|---|---|---|
| CN | 105163156 A | 12/2015 |

(Continued)

OTHER PUBLICATIONS

Tencent Technology, WO, PCT/CN2021/108308, Oct. 29, 2021, 4 pgs.

(Continued)

*Primary Examiner* — Heather R Jones
(74) *Attorney, Agent, or Firm* — Morgan, Lewis & Bockius LLP

(57) ABSTRACT

A video playback method is provided, including: displaying a video playback interface, and playing a current video on the video playback interface; and in accordance with a determination that the current video is a video clip corresponding to a portion of a target video and a video playback switching condition is satisfied: playing the target video on the video playback interface starting from a playback start time of the target video.

19 Claims, 9 Drawing Sheets

(56) References Cited

U.S. PATENT DOCUMENTS

| | | | | |
|---|---|---|---|---|
| 2020/0322684 A1* | 10/2020 | Dong | ............... | H04N 21/4668 |
| 2021/0377618 A1* | 12/2021 | Xiong | ............... | H04N 21/8456 |
| 2021/0409812 A1* | 12/2021 | Sen | ................. | H04N 21/2668 |

FOREIGN PATENT DOCUMENTS

| | | | | |
|---|---|---|---|---|
| CN | 108024145 A | 5/2018 | | |
| CN | 110225409 A | 9/2019 | | |
| CN | 110691281 A | 1/2020 | | |
| CN | 111263235 A | 6/2020 | | |
| CN | 111327940 A | 6/2020 | | |
| CN | 111338537 A | 6/2020 | | |
| CN | 112153470 A | 12/2020 | | |
| WO | WO-2020007082 A1 * | 1/2020 | ....... | H04N 21/23418 |

OTHER PUBLICATIONS

Tencent Technology, IPRP, PCT/CN2021/108308, Mar. 7, 2023, 5 pgs.

Tencent Technology, ISR, PCT/CN2021/108308, Oct. 29, 2021, 3 pgs.

* cited by examiner

VIDEO PLAYBACK METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2021/108308, entitled "VIDEO PLAYBACK METHOD AND APPARATUS, COMPUTER DEVICE, AND STORAGE MEDIUM" filed on Jul. 26, 2021, which claims priority to Chinese Patent Application No. 202010956362.3, filed with the State Intellectual Property Office of the People's Republic of China on Sep. 11, 2020, and entitled "VIDEO PLAYBACK METHOD AND APPARATUS, COMPUTER DEVICE, AND STORAGE MEDIUM", all of which are incorporated herein by reference in their entirety.

FIELD OF THE TECHNOLOGY

This application relates to the field of computer technologies, and in particular, to a video playback method and apparatus, a computer device, and a storage medium.

BACKGROUND OF THE DISCLOSURE

Currently, many video clients provide a short video service for users, through which short videos may be acquired from a server and played for users. However, in this video playback scheme, users can watch only short videos. If users desire to watch a full video corresponding to a short video clip after watching the short video clip, users need to search for a relevant full video and then play the video. The operations in this video playback scheme are relatively complicated.

SUMMARY

A video playback method is provided, including:
displaying a video playback interface;
playing a current video on the video playback interface; and
in accordance with a determination that the current video is a video clip corresponding to a portion of a target video and a video playback switching condition is satisfied:
playing the target video on the video playback interface starting from a playback start time of the target video.

A video playback apparatus is provided, including:
a display unit, configured to display a video playback interface;
a playback unit, configured to play a current video on the video playback interface; and
a playback switching unit, configured to, in accordance with a determination that the current video is a video clip corresponding to a portion of a target video and a video playback switching condition is satisfied, play the target video on the video playback interface starting from a playback start time of the target video.

A computer device is provided, including a memory and a processor, the memory storing computer-readable instructions, the computer-readable instructions, when executed by the processor, causing the processor to perform the following operations:
displaying a video playback interface;
playing a current video on the video playback interface; and
in accordance with a determination that the current video is a video clip corresponding to a portion of a target video and a video playback switching condition is satisfied:
playing the target video on the video playback interface starting from a playback start time of the target video.

A non-transitory computer-readable storage medium storing computer-readable instructions, the computer-readable instructions, when executed by one or more processors, causing the one or more processors to perform the following operations:
displaying a video playback interface;
playing a current video on the video playback interface; and
in accordance with a determination that the current video is a video clip corresponding to a portion of a target video and a video playback switching condition is satisfied:
playing the target video on the video playback interface starting from a playback start time of the target video.

A computer program product or a computer program is provided, the computer program product or the computer program including computer instructions, the computer instructions being stored in a non-transitory computer-readable storage medium. A processor of a computer device reads the computer instructions from the non-transitory computer-readable storage medium, and when executing the computer instructions, the processor performs the following steps:
displaying a video playback interface;
playing a current video on the video playback interface; and
in accordance with a determination that the current video is a video clip corresponding to a portion of a target video and a video playback switching condition is satisfied:
playing the target video on the video playback interface starting from a playback start time of the target video.

Details of one or more embodiments of this application are provided in the accompanying drawings and descriptions below. Other features, objectives, and advantages of this application become apparent from the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person skilled in the art may still derive other drawings from these accompanying drawings without creative efforts.

DESCRIPTION OF EMBODIMENTS

The technical solutions in embodiments of this application are clearly and completely described in the following with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

Embodiments of this application provide a video playback method and apparatus, a computer device, and a storage medium.

This embodiment provides a video playback system, including a terminal and a server that provides a required service (such as, a video) for the terminal.

The terminal may be a mobile terminal such as a mobile phone, a tablet computer, or a notebook computer, or may be a fixed terminal such as a smart television or a desktop computer. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform, but is not limited thereto.

Figures 1, 2:
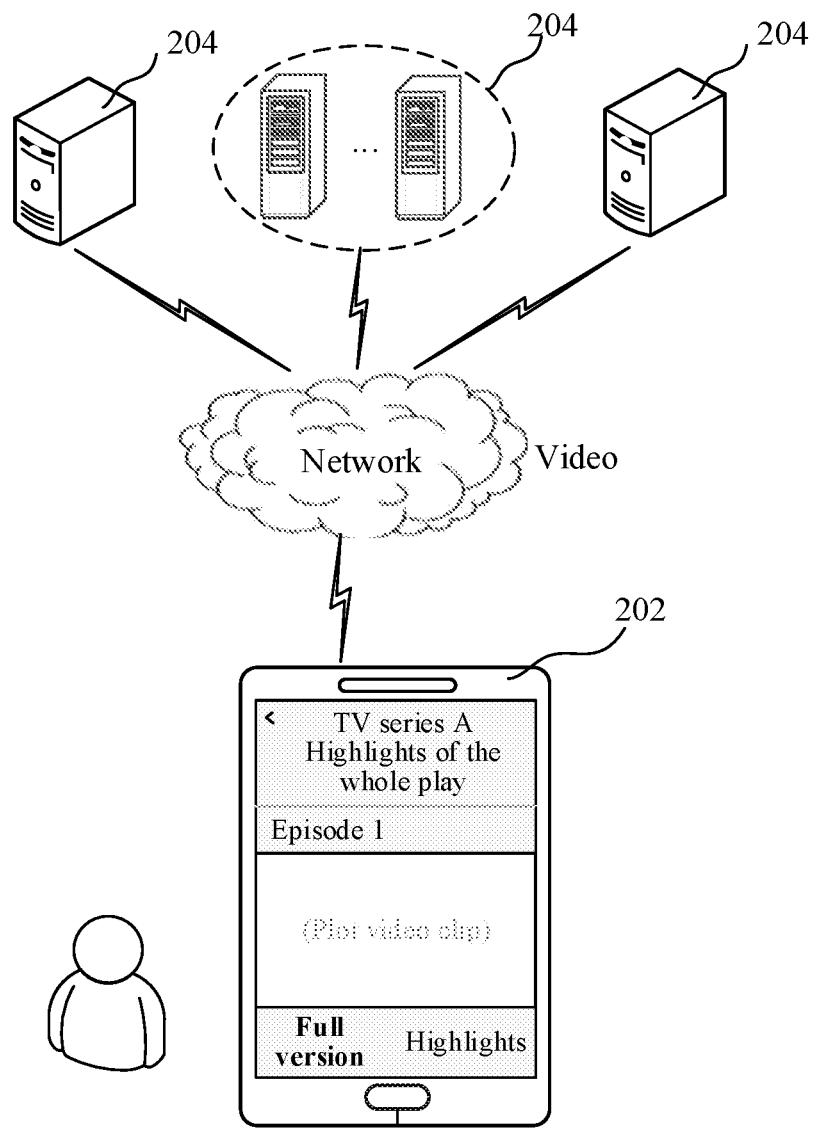
FIG. 1 is a schematic structural diagram of a video playback system according to an embodiment of this application.
FIG. 2 is a diagram of an application scenario of a video playback method according to an embodiment of this application.

Referring to FIG. 1, the video playback system provided in this embodiment includes a terminal 102, a server 104, and the like. The terminal 102 and the server 104 are connected through a network, for example, through a wired or wireless network.

The terminal 102 may display a video playback interface, and play a current video on the video playback interface; determine a playback start time of the target video when the current video is a video clip corresponding to a portion of the target video; and in accordance with a determination that a video playback switching condition is satisfied: play the target video on the video playback interface starting from the playback start time of the target video. The terminal 102 may send an acquisition request for the target video to the server 104 when the video playback switching condition is satisfied, receive the target video transmitted by the server 104 in response to the acquisition request, and switch to playback of the target video through the video playback interface. The server 104 may be configured to acquire data of the target video and transmit the data of the target video to the terminal after receiving the acquisition request for the target video.

In an embodiment, the video playback method provided in this application is applicable to an application scenario shown in FIG. 2. The application scenario includes a system including the terminal 202 and the server 204, and is realized through interaction between the terminal 202 and the server 204. A terminal 202 communicates with a server 204 through a network. Specifically, the terminal 202 may transmit a video acquisition request to the server 204. The server 204 acquires a video corresponding to the video acquisition request and feeds the video back to the terminal 202 in response to the video acquisition request. After the terminal 202 receives the video fed back by the server 104, the terminal 202 displays the video playback interface, and plays the received current video on the video playback interface. The terminal 202, in accordance with a determination that the current video is the video clip in the target video and the video playback switching condition is satisfied, plays the target video on the video playback interface starting from the playback start time of the target video.

Detailed descriptions are separately performed below. A description order of the following embodiments is not construed as a limitation on a preferred order of the embodiments.

Figure 3:
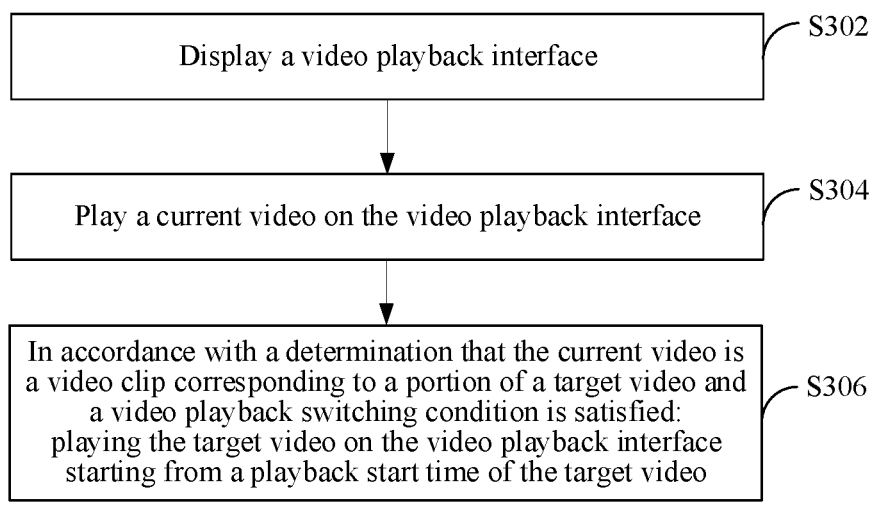
FIG. 3 is a flowchart of the video playback method according to an embodiment of this application.

An embodiment of this application provides a video playback method. The method may be performed by a terminal, or may be jointly performed by a terminal and a server. In this embodiment of this application, the, for method is applied to the terminal example. As shown in FIG. 3, a process of the video playback method may be as follows:

Step S302: Display a video playback interface.

The terminal in this embodiment may be a video client. The video client may be any client that can provide a video playback function.

It may be understood that the video playback interface is an interface displayed on a screen of the video client for playing a video.

Specifically, the terminal may run an application program deployed in the terminal to display the video playback interface. The terminal may alternatively access a corresponding video website through a browser deployed in the terminal to display the video playback interface. For example, specifically, a video playback page in the video website may be displayed, and a video may be played on the video playback page.

Step S304: Play a current video on the video playback interface.

It may be further understood that the current video may be a video selected by a user on the video playback interface.

Specifically, the video playback interface includes at least one candidate video. The user may select a video from the at least one candidate video through a corresponding video client, and play the video on the video playback interface. The video currently selected by the user is the current video.

The terminal may first display the video playback interface, and the user may select a video allowing playback on the video playback interface, so that the terminal plays the selected current video on the video playback interface.

Step S306: In accordance with a determination that the current video is the video clip corresponding to a portion of a target video and a video playback switching condition is satisfied, play a target video on the video playback interface starting from a playback start time of the target video.

The video is a series of consecutive picture images, and the video clip may be a part of the video, for example, may be a consecutive picture in the video. Each video may include a plurality of video clips. Each video clip may be a separate video. The term "plurality of" means at least two.

The video playback switching condition may be a condition for switching playback of the current video. For example, the video playback switching condition may include the end of the playback of the current video or a video switching operation performed by the user on the playback interface. The playback start time of the target video may be a time of starting to play the target video on the video playback interface.

During the playback of the current video, if the terminal detects that the current video is the video clip in the target video and the video playback switching condition is satisfied, the terminal plays the target video on the video playback interface starting from the playback start time of the target video.

The target video in this embodiment may be understood as a full video. Each target video may include a plurality of video clips. The target video may be a video in a video work. The video work in this embodiment may be any type of work including videos, such as a TV series, a film, an animation, or a variety show, and the like. For example, the video work is the TV series "XX but thirty", the film "Transformers XX", or the variety show "Running . . . ". A video work may include a plurality of videos, and a quantity of videos depends on a video output of a producer of the video work.

In this embodiment, the target video and the video clip may be respectively considered as a long video and a short video. In this embodiment, the video in the video work is generally the long video. The long video is relative to the short video. The short video is a video clip, which is an Internet content spread manner, and is generally a video with a duration of less than 5 minutes that is spread on the Internet new media. A length of the long video is not limited, which may be 20 minutes, 30 minutes, 40 minutes, or the like.

Videos in the video work may be divided by the producer of the video work. For example, for the video work of the TV series, one episode of the TV series is one video, for the video work of the variety show, a video of one episode of the variety show is one video, for a video work of a documentary, one episode of the documentary is one video, and for the video work of the film, one film is one video. If a film includes a film series, all films in the film series constitute the video work, and each film is one video in the video work. For example, each film in the film series "Harry XX" is one video of the video work.

In this embodiment, each video includes at least one video clip, each video clip is a part of the video, and a duration of a different video clip may be the same or different. This is not limited in this embodiment. A quantity of video clips in one video is not limited.

In this embodiment, during the playback of the current video on the video playback interface, if it is detected that the current video is the video clip in the target video and the video playback switching condition is satisfied, the current video is directly switched to the corresponding target video, and the target video is played on the video playback interface starting from the playback start time of the target video. In this way, video playback can be switched conveniently, so that the user can conveniently switch from the current video to the target video from which more video contents can be acquired, which effectively reduces the operation costs for the user, thereby effectively improving the operation convenience during the video playback.

In an embodiment, step S302 of displaying the video playback interface may include: displaying a video selection interface of the video client, the video selection interface including candidate videos; and displaying the video playback interface and playing video content of the target video on the video playback interface in response to a video playback operation on the target video in the candidate videos.

In this embodiment, "in response to" is used for representing a condition or state on which one or more operations to be performed depend. When the condition or state is satisfied, the one or more operations may be performed immediately or after a set delay. Unless explicitly stated, there is no limitation on the order in which the plurality of operations are performed.

The video content may be a video clip from a video of a target video work, or may be a video from the target video work, which is not limited in this embodiment.

For example, the terminal plays a first video clip of a first video of the target video work through the video playback interface; or plays the first video of the target video work through the video playback interface; or determines, based on historical video playback information of a current user, historical video content in the target video work recently watched by the user, plays a video clip if the historical video content is from the video clip, and plays a video if the historical video content is from the video.

In this embodiment, the current video may be played in a portrait mode.

In an embodiment, step S306 of in accordance with a determination that the current video is the video clip in the target video and the video playback switching condition is satisfied: playing the target video on the video playback interface starting from the playback start time of the target video, may include: in accordance with a determination that current video is the video clip in the target video: determining the playback start time of the target video; in accordance with a determination that the video playback switching condition is satisfied: and playing the target video on the video playback interface starting from the playback start time.

In this embodiment, the playback start time of the target video is a time point in a playback time period of the target video at which current playback starts. The playback time period of the target video represents a time period from a start time point 00:00 (min:sec) of the target video to an end time point of the target video, such as 45:20 (min:sec). In an embodiment, the playback start time of the target video may be fixed.

In an embodiment, in accordance with a determination that the current video is the video clip in the target video determining the playback start time of the target video may include: in accordance with a determination that the current video is the video clip in the target video: determining a playback end time point of the current video in the target video, and determining the playback end time point of the current video in the target video as the playback start time of the target video. The step of in accordance with a determination that the video playback switching condition is satisfied: playing the target video on the video playback interface starting from the playback start time includes: in accordance with a determination that the video playback switching condition is satisfied: playing the target video on the video playback interface starting from the playback start time.

For example, a start time point of the target video is 00:00 (min:sec), an end time point is 45:20 (min:sec), a playback start time point of the current video in the target video is 20:01 (min:sec), and a playback end time point is 21:40 (min:sec). The terminal may determine that the time point 20:01 (min:sec) in the target video is the start time point of the current playback of the target video, or determine that the time point 21:40 (min:sec) in the target video is the start time point of the current playback of the target video.

In another example, the playback start time of the target video may be determined according to a playback progress of the current video.

In an embodiment, the step of in accordance with a determination that the current video is the video clip in the target video determining the playback start time of the target video includes: in accordance with a determination that the current video is the video clip in the target video and the video playback switching condition is satisfied: determining a time point in the target video corresponding to an actual playback time point of the current video as the playback start time of the target video.

The actual playback time point of the current video may be a playback time point of the current video when the video playback switching condition is satisfied. The time point in the target video corresponding to the actual playback time point of the current video may mean that video content corresponding to the actual playback time point of the current video is the same as video content in the target video at the corresponding time point.

For example, it is still assumed that the start time point of the target video is 00:00 (min:sec), the end time point is 45:20 (min:sec), a duration of the current video is 1 minute and 39 seconds, the playback start time point in the target video is 20:01 (min:sec), and the playback end time point is 21:40 (min:sec). The current video is played to the twentieth second when the video playback switching condition is satisfied. The terminal learns, through calculation of time, that the time point in the target video corresponding to the actual playback time point of the current video is 20:21 (min:sec). Therefore, it may be determined that the time point 20:21 (min:sec) in the target video is the start time point of the current playback of the target video.

In an embodiment, step S306 of in accordance with a determination that the current video is the video clip in the target video and the video playback switching condition is satisfied: playing the target video on the video playback interface starting from the playback start time of the target video may include: in accordance with a determination that the current video is the video clip in the target video and the video playback switching condition is satisfied: displaying a video switching widget corresponding to the target video on the video playback interface; and playing the target video on the video playback interface starting from the playback start time of the target video in response to a full video playback operation on the video switching widget of the video playback interface.

In this embodiment, the video playback interface includes a video switching widget. The video switching widget may be a widget configured to instruct the terminal to perform a full video playback operation or a widget configured to instruct the terminal to perform a switching operation on the current video. For example, the terminal plays the target video on the video playback interface starting from the playback start time of the target video in response to the full video playback operation corresponding to the target video.

Specifically, when detecting a trigger operation on the video switching widget, the terminal may play the target video on the video playback interface starting from the playback start time of the target video.

Figure 4:
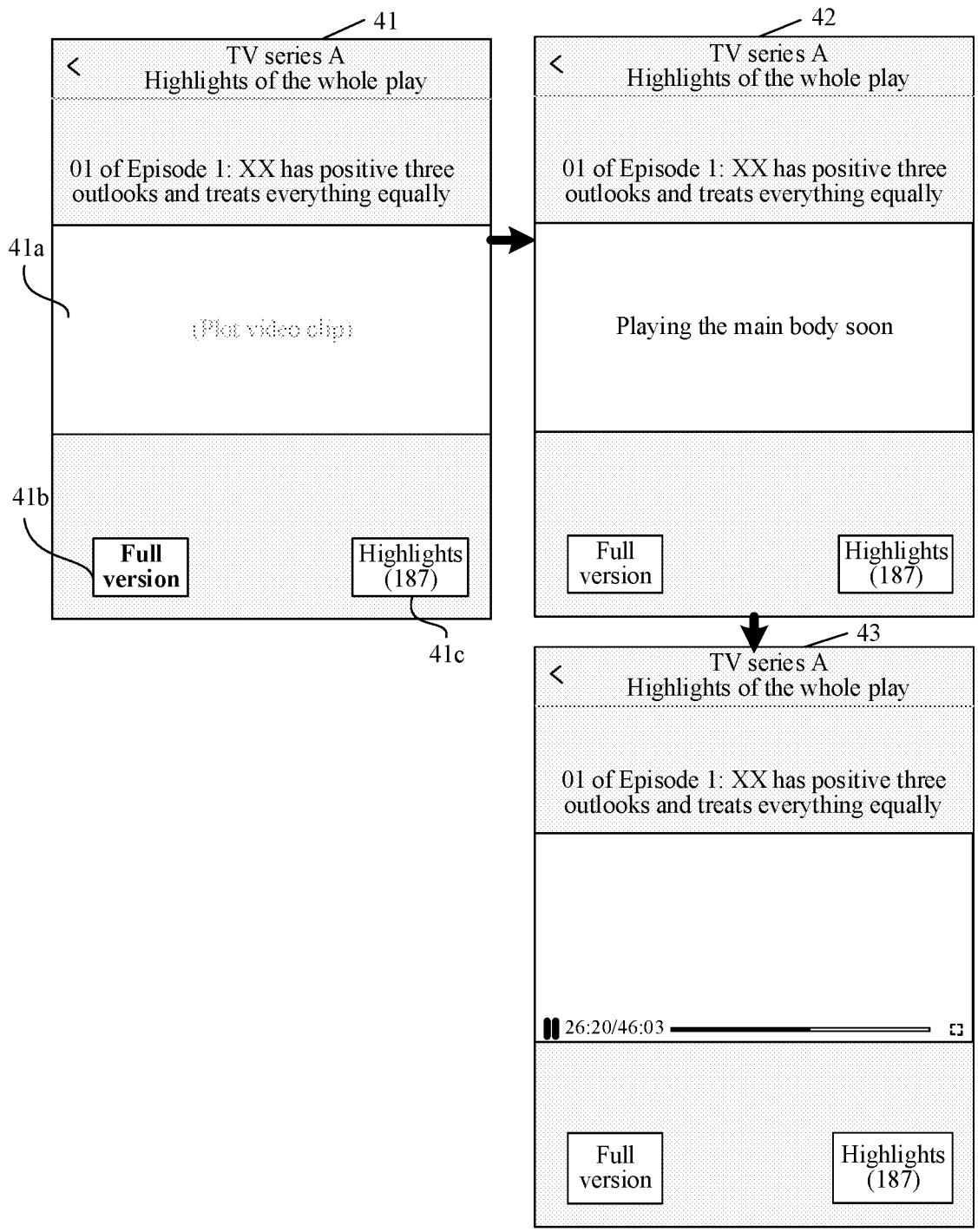
FIG. 4 is a schematic diagram of switching to playback of a video to which a video clip belongs on a video playback interface according to an embodiment of this application.

For example, referring to FIG. 4, a video playback interface 41 in FIG. 4 includes a video display area 41a, a video switching widget 41b, and a video list display widget 41c. In FIG. 4, the video playback interface 41 plays the target video in a portrait mode. The video playback interface 41 includes identification information of the video work, such as a name of the video work. The video playback interface 41 is playing a first video clip of a first episode of a TV series A. The video playback interface 41 displays position information of a video to which the first video clip belongs in the video work, that is, "the first episode", information about the order of plot development of the first video clip in the video, for example, "01", and plot description information of the first video clip, for example, "XX has positive three outlooks, and treats everything equally", and displays content of the played video clip in the video display area 41a.

After the playback of the video clip ends, as shown in the video playback interface 42, the terminal switches to playback of the first episode of the TV series A on the video playback interface. If it is assumed that the last second of the first video clip of the first episode of TV series A is 20:19 (min:sec) in the first episode, as shown in the video playback interface 43, the video in the first episode is played from starting 20:20 (min:sec) during switching to playback of the first episode of the TV series A on the video playback interface.

For example, referring to FIG. 4, the video playback interface 41 displays a video switching widget 41a, such as a widget named as "full version". When detecting a trigger operation on the widget "full version", the terminal determines that the video playback switching condition is satisfied, and the terminal plays the target video on the video playback interface starting from the playback start time of the target video.

Before playing the video, the terminal may further notify the user that the video is about to be played through prompt information, so as to prevent the user from being blind to switching of video playback.

In an embodiment, the step of playing the target video on the video playback interface starting from the playback start time of the target video in response to the end of the playback of the current video may include: displaying preset video playback prompt information through the video playback interface in response to the end of the playback of the current video, the preset video playback prompt information being used for prompting that the target video to which the current video belongs is about to be played; and in accordance with a determination that a display duration of the preset video playback prompt information reaches a preset display duration threshold: playing the target video on the video playback interface starting from the playback start time of the target video.

The preset video playback prompt information may be displayed in a form of a pop-up box, a sub-interface, or the like, which is not limited in this embodiment. The preset display duration threshold may be set by the server, for example, may be set to 3 seconds.

In some embodiments, still referring to FIG. 4, during the playback of the video on the video playback interface 41a, after the playback of the first video clip of the first episode ends, as shown in the video playback interface 42, preset video playback prompt information "Playing the main body soon" is displayed in the video display area. After the display duration of the preset video playback prompt information reaches 3 seconds, as shown in the video playback interface 43, playback of the first episode of the TV series A is switched to on the video playback interface.

In this embodiment, when a video is played on the video playback interface, an associated video of the video may be played when the playback of the video ends. This is not limited in this embodiment.

In an example, after the step of playing the target video starting from the playback start time of the target video, the above video playback method may further include: in accordance with a determination that the video playback switching condition is satisfied: switching to playback of a video clip of an associated video of the target video on the video playback interface, the associated video being associated with the target video.

In this embodiment, the associated video of the target video is associated with the target video in attribute. For example, the associated video and the video may be produced by a same producer, or belong to a same video work, for example, may be different episodes of a same TV series.

If a plurality of associated videos exists, during switching to playback of the video clip of the associated video of the target video on the video playback interface, playback of a video clip of an associated video that follows a plot of the target video may be switched.

For example, the target video is the first video of the video work. When the video playback switching condition is satisfied (for example, the playback of the target video ends), playback of a video clip (such as the first video clip) of a second video episode of the video work on the video playback interface is switched to.

In some embodiments, a plurality of video playback switching conditions may exist.

In an embodiment, after the playing a target video on the video playback interface starting from a playback start time of the target video, the above video playback method further includes: displaying a video list corresponding to the target video in response to a video list display operation on the video playback interface; and switching to playback of a target video clip through the video playback interface in response to a playback operation on the target video clip.

The video list includes at least one video clip of the target video and the associated video of the target video, and the at least one video clip is arranged according to an order of plot development in the video to which the video clip belongs. The video list is a list including a plurality of videos. For example, the video list may specifically be a list including a plurality video files, or may be a list including link addresses of a plurality of videos.

The video list display operation in this embodiment is an operation for displaying the video list. The video list display operation may be a touch operation, a gesture operation, or an operation triggered by a widget. This is not limited in this embodiment.

The order of plot development in this embodiment may be understood as a position order, a chronological order, or the like of the video clip in the video.

In some embodiments, video clips in a same video may be video clips that do not overlap in time.

In this embodiment, the video list may be displayed in a form of a floating layer, a pop-up box, a sub-page, a new page, or the like.

In an embodiment, the step of displaying the video list corresponding to the target video in response to the video list display operation on the video playback interface includes: displaying an episode selection floating layer on the video playback interface in response to a preset sliding operation on the video playback interface, the video list corresponding to the target video being displayed on the episode selection floating layer. The preset sliding operation is a predefined specific sliding operation, and a sliding direction and a sliding start point of the preset sliding operation are predefined. For example, the sliding direction is from right to left, and a distance from the sliding start point to a right border of a terminal display screen is within a preset distance threshold.

In some embodiments, a display manner of the episode selection floating layer is not limited. The episode selection floating layer may be displayed by pulling from a fixed position on a display screen, or may be displayed by popping up directly. In this embodiment, the fixed position may be an interface boundary on the video playback interface close to the sliding start point.

In some embodiments, in response to the preset sliding operation on the video playback interface, the episode selection floating layer may be pulled out from the interface boundary on the video playback interface that is perpendicular to the sliding direction of the preset sliding operation.

Figure 5:
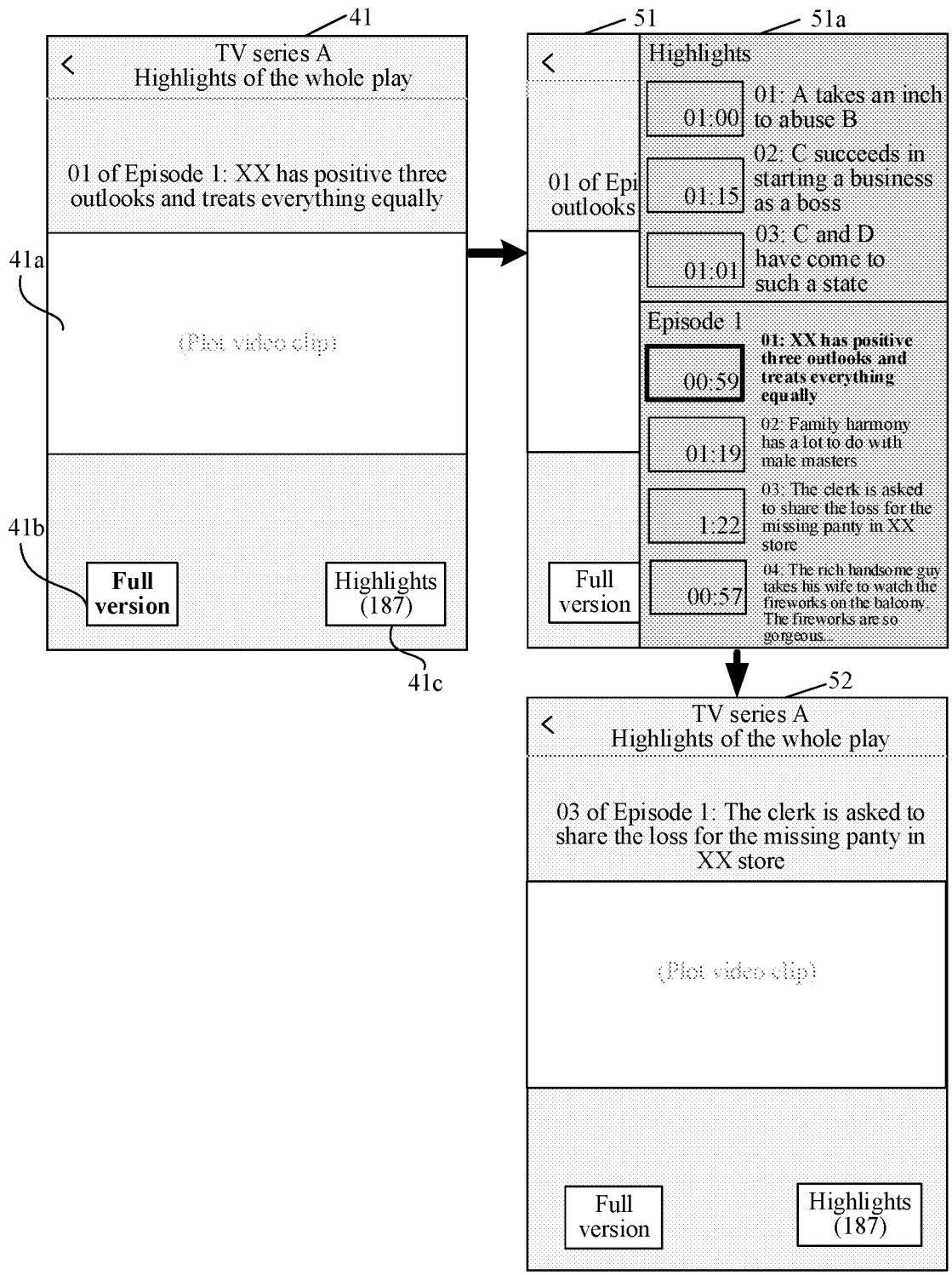
FIG. 5 is a schematic diagram of switching to playback of a video clip on a video playback interface according to an embodiment of this application.

For example, referring to FIG. 5, a video playback interface 41 in FIG. 5 includes a video display area 41a, a video switching widget 41b, and a video list display widget 41c. In FIG. 5, the target video is played on the video playback interface in a portrait mode. The video playback interface 41 includes identification information of the video work, such as a name of the video work. The video playback interface 41 is playing a first video clip of a first episode of a TV series A. The video playback interface 41 displays position information of a video to which the first video clip belongs in the video work, that is, "the first episode", information about the order of plot development of the first video clip in the video, for example, "01", and plot description information of the first video clip, for example, "XX has positive three outlooks, and treats everything equally", and When detecting a right-to-left sliding operation triggered by a user from a position close to a right border of the interface on the video playback interface 41, the terminal pulls out an episode selection floating layer 51a from the right border of the video playback interface 41, so that the video playback interface 41 becomes a video playback interface 51. A video list of the TV series A is displayed on the episode selection floating layer 51a on the video playback interface 51. The list includes video clips of the first episode to the last episode of the TV series A. Due to a limited display area of the episode selection floating layer, list content displayed on the episode selection floating layer includes the video clip in the video to which the video clip being played belongs and nearby video clips. For example, the first video clip of the first episode video is being played on the video playback interface 41, and video clips in the first episode is displayed in a list on the video playback interface 51. A user may perform a downward sliding operation on the episode selection floating layer to display video clips in a video that follows the first episode. If the user clicks/taps a video clip on the episode selection floating layer, the video clip is played. For example, if the user clicks/taps a third video clip "03: The clerk is asked to share the loss for the missing panty in XX store" of the first episode in the list on the episode selection floating layer 51a on the video playback interface 51, playback of the third video clip of the first episode is switched to on the video playback interface, as shown in a video playback interface 52.

Certainly, it may be understood that, the episode selection floating layer in this embodiment may be replaced by an episode selection pop-up box, an episode selection sub-page, or the like.

In some embodiments, a specific widget may be further disposed to control the display of the video list.

In an embodiment, the video playback interface includes a video list display widget, and the step of displaying the video list corresponding to the target video in response to the video list display operation on the video playback interface may include: displaying an episode selection floating layer on the video playback interface in response to a trigger operation on the video list display widget, the video list corresponding to the target video being displayed on the episode selection floating layer. The video list display widget is a widget configured to display the video list. Specifically, the terminal displays the video list corresponding to the target video after detecting an operation performed by the user on the video list display widget.

For example, still referring to FIG. 4, the video list display widget 41c is displayed on the video playback interface 41, such as a widget named "Highlights". A total quantity of video clips of video work such as the TV series A, such as 187 (refer to 201) is also displayed in the display area of the video list display widget 41c.

When a trigger operation on the widget "Highlights" on the video playback interface 41 is detected, for example, a touch operation such as clicking/tapping or double-clicking/tapping, as shown in FIG. 5, the video playback interface 41 is changed to the video playback interface 51, and the episode selection floating layer 51a is displayed on the video playback interface 51. On the video playback interface 51, the video list of the TV series A is displayed on the episode selection floating layer 51a. The video list corresponding to the target video is displayed on the episode selection floating layer. In this example, for a specific display scheme of the episode selection floating layer, reference may be made to the description in the above example, which is not be repeated herein.

In some embodiments, in response to the playback operation on the target video clip, the above video list is hidden before switching to the playback of the target video clip through the video playback interface.

In this embodiment, after the playback of the target video clip ends, in addition to the video to which the target video clip belongs, a video clip next to the target video clip in the video list may be played.

In this embodiment, the video clip of each video is considered as a whole in the video list, and the video clips of different videos in the list are arranged according to an order of the videos in terms of plot development. For example, for a TV series, video clips are arranged from the first episode to the last episode. For a variety show, the video clips are arranged according to a broadcast time.

Figure 6:
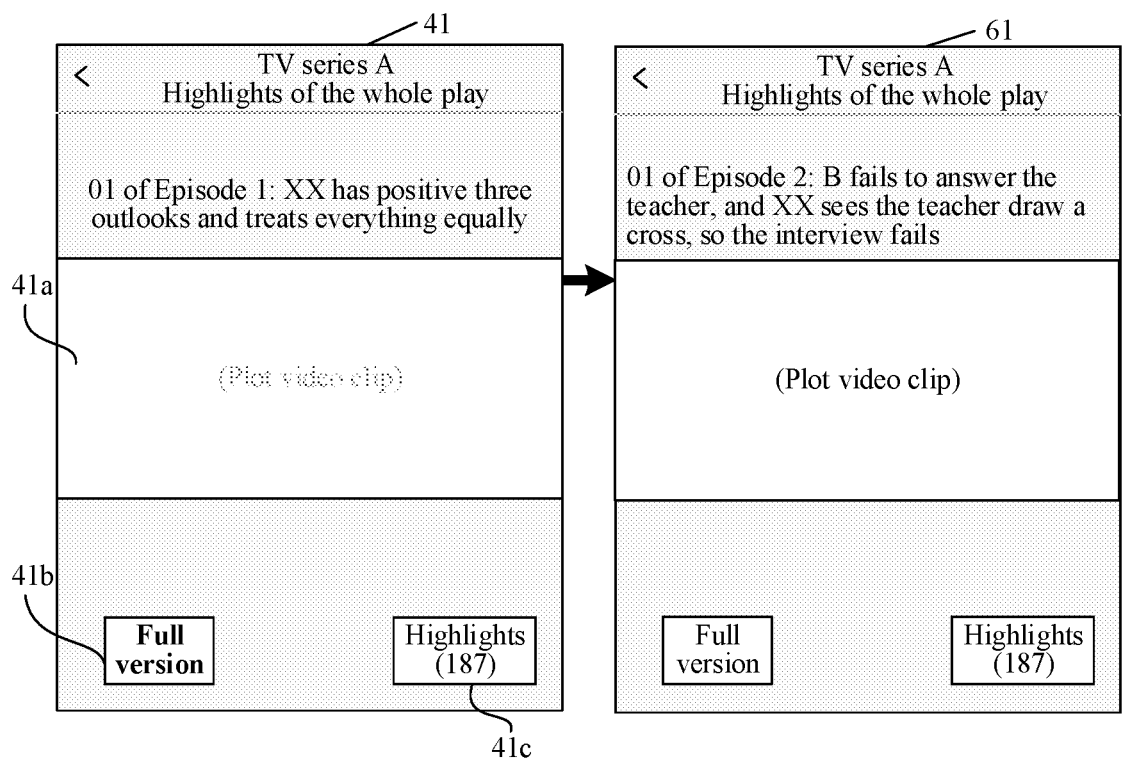
FIG. 6 is a schematic diagram of switching to a video clip of a next video on a video playback interface according to an embodiment of this application.

For example, referring to FIG. 6, the first episode of TV series A is being played on the video playback interface 41 shown in FIG. 6. After the playback of the first episode ends, as shown in the video playback interface 61 in FIG. 6, playback of the first video clip of the video of the second episode on the video playback interface 61 is switched to.

In some embodiments, a user may configure whether to play the video or play the next video clip after the playback of the current video clip ends.

In an example, after the step of playing the target video starting from the playback start time of the target video on the video playback interface, the method further includes: in accordance with a determination that the playback of the current video playback ends: displaying a playback mode selection widget on the video playback interface, the playback mode selection widget including a video clip continuous-playback sub-widget and a video playback sub-widget; and in accordance with a determination that a selection operation on the video playback sub-widget is detected: playing the target video on the video playback interface starting from the playback start time of the target video.

After the playback mode selection widget is displayed on the video playback interface, the method further includes: in accordance with a determination that a selection operation on the video clip continuous-playback sub-widget is detected: playing, through the video playback interface, a video clip that follows the current video among the video clips of the target video and the associated video of the target video.

The video clip that follows the current video is a video clip that follows the current video according to the order of plot development.

The playback mode selection widget may further include a playback mode maintaining sub-widget.

When the terminal detects the selection operation on the video clip continuous-playback sub-widget, if the playback mode maintaining sub-widget is in a selected state, a first playback rule is further added to a playback rule for the video client. The first playback rule includes: in accordance with a determination that playback of a video clip of a video ends: automatically switching to playback of a next video clip on the video playback interface.

When the terminal detects the selection operation on the video playback sub-widget, if the playback mode maintaining sub-widget is in a selected state, a second playback rule is further added to the playback rule for the video client. The second playback rule includes: in accordance with a determination that a video clip of a video of a video work ends: automatically switching to playback of the video to which the video clip belongs on the video playback interface.

Figure 7:
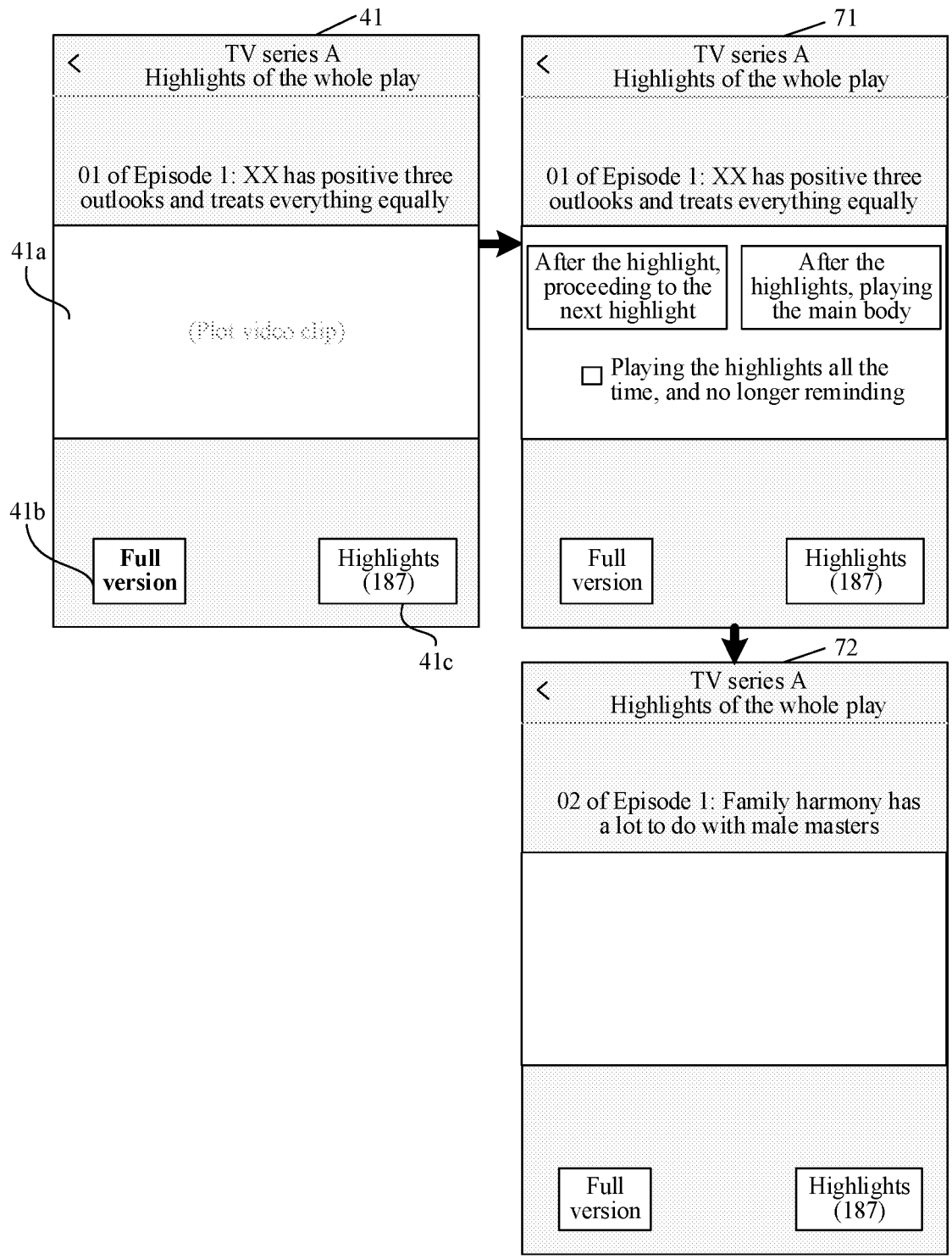
FIG. 7 is a schematic diagram of implementing video content switching through a widget on a video playback interface according to an embodiment of this application.

For example, referring to FIG. 7, the first video clip of the first episode of the TV series A is being played on the video playback interface 41 shown in FIG. 4. When the playback of the clip ends, for example, on the video playback interface 41, a video clip continuous-playback sub-widget such as a widget named "After the highlight, proceeding to the next highlight", a video playback sub-widget such as a widget named "After the highlights, playing the main body", and a playback mode maintaining sub-widget such as a widget where "Playing the highlights all the time, and no longer reminding" is displayed are displayed in the video display area. When the user clicks/taps the playback mode maintaining sub-widget, selected prompt information such as a tick pattern is displayed in a box before the information "Playing the highlights all the time, and no longer reminding". Afterwards, if the user clicks/taps the video clip continuous-playback sub-widget, as shown in a video playback interface 72, playback of the second video clip of the first episode of the TV series A is switched to on the video playback interface 72, and the above first playback rule is added to the first playback rule for the video client. Therefore, when the user uses the video client subsequently, the video is played based on the first playback rule.

Figure 8:
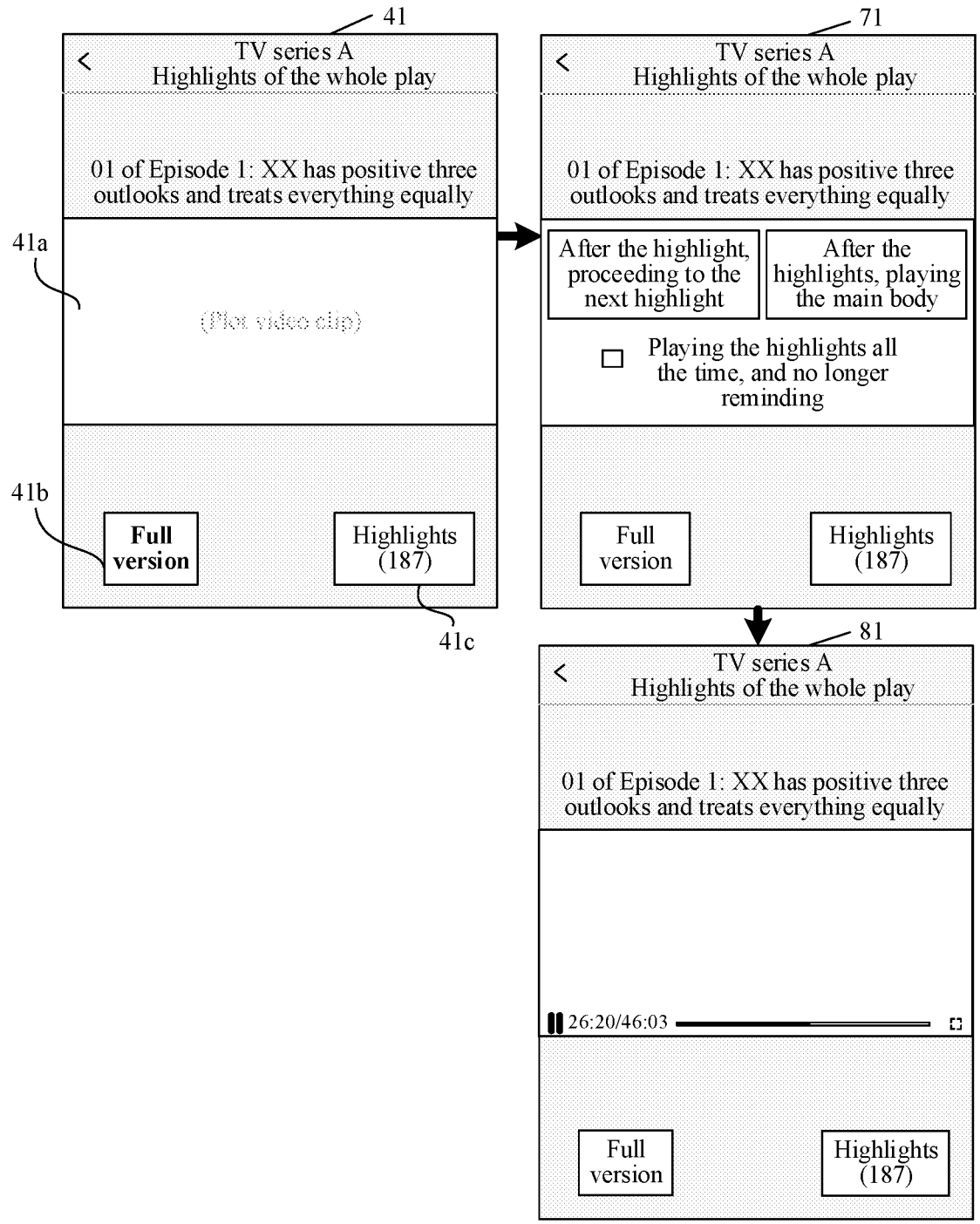
FIG. 8 is a schematic diagram of implementing video content switching through a widget on a video playback interface according to an embodiment of this application.

Referring to FIG. 8, if the user initiates a trigger operation, for example, a touch operation such as clicking/tapping or double-clicking/tapping on the video playback sub-widget after clicking/tapping the playback mode maintaining sub-widget on the video playback interface 72 in FIG. 7, playback of the video of the first episode of the TV series A is switched to through the video playback interface 81. The playback starts from the video content that follows the first video clip of the first episode, as shown in a video playback interface 81 in FIG. 8.

The terminal in this embodiment further provides a playback mode switching function, through which the user may switch to a landscape mode or a portrait mode.

In some embodiments, the above video playback method may further include: displaying a playback control widget on the video playback interface in response to a display operation on the playback control widget on the video playback interface, the playback control widget including a playback mode switching widget; in accordance with a determination that a current playback mode of the video playback interface is a portrait mode: switching a playback mode of the video playback interface to a landscape mode in response to a trigger operation on the playback mode switching widget; in accordance with a determination that the current playback mode of the video playback interface is the landscape mode: switching the playback mode of the video playback interface to the portrait mode in response to a trigger operation on the playback mode switching widget.

Figure 9:
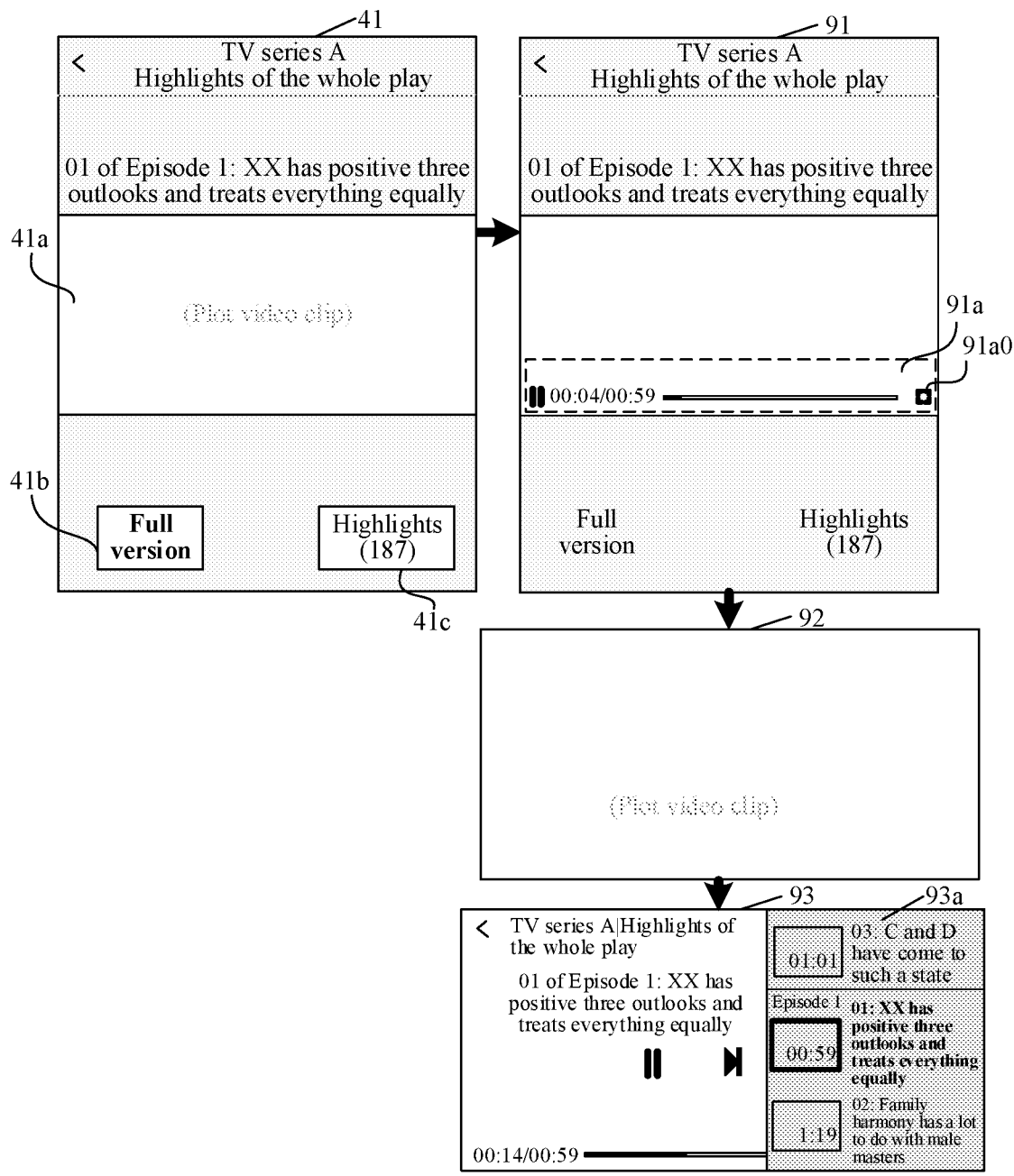
FIG. 9 is a schematic diagram of switching a video playback mode on a video playback interface according to an embodiment of this application.

For example, referring to FIG. 9, the first video clip of the first episode of the TV series A is being played on the video playback interface 41 shown in FIG. 4. When the terminal detects a display operation, for example, a touch operation such as clicking/tapping, double-clicking/tapping, or sliding on the playback control widget on the video playback interface 41, a playback control widget 91a is displayed on the video playback interface 91, as shown in the video playback interface 91 in FIG. 9. The playback control widget in this embodiment may include a plurality of sub-widgets 91a0 having a video playback control function, such as above the playback mode switching widget, that is, a widget indicated by an icon "" on the video playback interface 91 of FIG. 9. The icon of the playback mode switching widget may be different in the portrait mode and the landscape mode. When the user clicks/taps the icon "" on the video playback interface 91, a video playback interface 92 is displayed, on which the first video clip of the first episode of the TV series A is played in a full-screen playback mode.

In this embodiment, regardless of whether the playback mode of the video client is the landscape mode or the portrait mode, the video list corresponding to the target video may be displayed through the video list display operation.

For example, still referring to FIG. 9, when it is detected that the sliding start point is close to the right border of the video playback interface and the sliding direction is from right to left on the video playback interface 92, the episode selection floating layer is pulled out from the right border of the video playback interface 92 to display a video playback interface 93, and an episode selection floating layer 93a is displayed on the video playback interface 93.

In an embodiment, the step of displaying the video list corresponding to the target video in response to the video list display operation on the video playback interface may include: transmitting a list data acquisition request to a server in response to the video list display operation on the video playback interface, the list data acquisition request including a video identifier of the target video; receiving video list data transmitted by the server in response to the list data acquisition request, the video list data including description information and information about the order of plot development of the at least one video clip of the target video and the associated video of the target video, the video list data being generated by the server based on attribute information of a candidate video clip, and the attribute information including a video to which the candidate video clip belongs and position information of the candidate video clip in the video; displaying, based on the video list data, the video list corresponding to the target video.

In this embodiment, the server may acquire the candidate video clip of each video of the video work. The candidate video clip carries attribute information. The attribute information may include the video and the video work to which the candidate video clip belongs, a position of the candidate video clip in the video to which the candidate video clip belongs, and description information of the candidate video clip, such as the plot description information. The position of the candidate video clip in the video may be represented by a start time and an end time of the candidate video clip in the video, for example, the video clip is at 26:14 (min:sec) to 27:15 (min:sec) of the first episode of the TV series A.

The information about the order of plot development in this embodiment may be used for determining an order between the video clips of the video. The information about the order of plot development may be a position order of the video clips in the video.

In some embodiments, after the server acquires candidate video clips, for candidate video clips of a same video, a specific number of (for example, 5) candidate video clips may be selected from the candidate video clips based on positions of the candidate video clips in the video, or video clips with a total duration not exceeding a preset total duration threshold (for example, 5 minutes) may be selected, then video list data is generated based on the video clips corresponding to each video. Description information in the video list data may be obtained from attribute information.

Since repeatedly watching the video clip brings a poor video viewing effect, in this embodiment, a video playback control list may be used to resolve the problem that the terminal repeatedly plays the video clip. The video playback control list may be generated based on the above video list data. In this embodiment, relevant information of the candidate video clips for generating two lists is from a same network interface, and the above video list data is obtained by using a same data management center. After the video list data is obtained, the data is distributed to two list generation modules (of the server) to generate the video playback control list and the video list.

The video playback control list in this embodiment further includes at least one video clip of the target video and the associated video of the target video, and may be requested by the terminal from the server.

In a related solution, many terminals control the playback of the video according to the order between the video clips in the video playback control list. However, in this embodiment, in order to resolve the problem of repeated playback, the video playback control list is specially configured so that the list can be dynamically adjusted. In the video playback control list, a playback identifier field is set for each video clip, and the field may be used for setting a playback state of the video clip. If a Played identifier such as a value of 1 is set in the field, it indicates that the video clip is played. If an Unplayed identifier such as a value of 0 is set in the field, it indicates that the video clip is not played.

In an embodiment, the above video playback method further includes: in accordance with a determination that playback of a new video clip needs to be switched to on the video playback interface: acquiring the video playback control list of the video playback interface; determining an order between a to-be-played video clip and a video content currently played on the video playback interface in terms of plot development; selecting, based on the order and the video playback control list, a to-be-played video clip from video clips for which the Played identifier is not set; and switching to playback of the to-be-played video clip on the video playback interface, and setting, in the video playback control list, the Played identifier for the to-be-played video clip.

In this embodiment, the video playback control list includes at least one video clip of the target video and an associated video of the target video, the at least one video clip being arranged in an order of plot development in the video to which the video clip belongs, and a Played identifier being set for a played video clip in the video playback control list. That the playback of the new video clip needs to be switched to on the video playback interface may be automatically triggered by the terminal or may be triggered by the user.

For example, when a video is played on the video playback interface and the playback of the video ends, the terminal determines that the playback of the new video clip needs to be switched to on the video playback interface. Alternatively, if the playback rule for the video client includes the first playback rule, when the playback of the video clip on the video playback interface ends, it is determined that the playback of the new video clip needs to be switched to on the video playback interface. Alternatively, when a video-clip-switching sliding operation on the video playback interface (such as an upward sliding operation or a downward sliding operation) is detected, it is determined that the playback of the new video clip needs to be switched to on the video playback interface.

In this embodiment, if the terminal acquires the video playback control list of the video playback interface in response to the video-clip-switching sliding operation on the video playback interface, the terminal may determine, based on a video switching direction of the video-clip-switching sliding operation, an order between the to-be-played video clip and the video content currently played on the video playback interface in terms of plot development.

For example, if the video-clip-switching sliding operation is the upward sliding operation, the terminal determines that the to-be-played video clip is a video clip before the video content currently played on the video playback interface, and may select, based on the video playback control list from the video clips for which the Played identifier is not set, a video clip before the video content currently played as the to-be-played video clip.

For example, if the video-clip-switching sliding operation is the downward sliding operation, the terminal determines that the to-be-played video clip is a video clip that follows the video content currently played on the video playback interface, may select, based on the video playback control list from the video clips for which the Played identifier is not set, a video clip that follows the video content currently played as the to-be-played video clip.

In this embodiment, a dynamic change of the video playback control list, such as a change of the playback identifier field, may be in a unit of second. That is to say, the playback identifier field in the video playback control list is updated once every second. In this embodiment, if a video clip is played on the video playback interface, the terminal may set the Played identifier for the video clip. If a video is played on the video playback interface, the video clip of the video that has been played may be determined according to a playback duration of the video and a position of the video clip in the video, and the Played identifier is set for the played video clip in the video playback control list.

Figure 10:
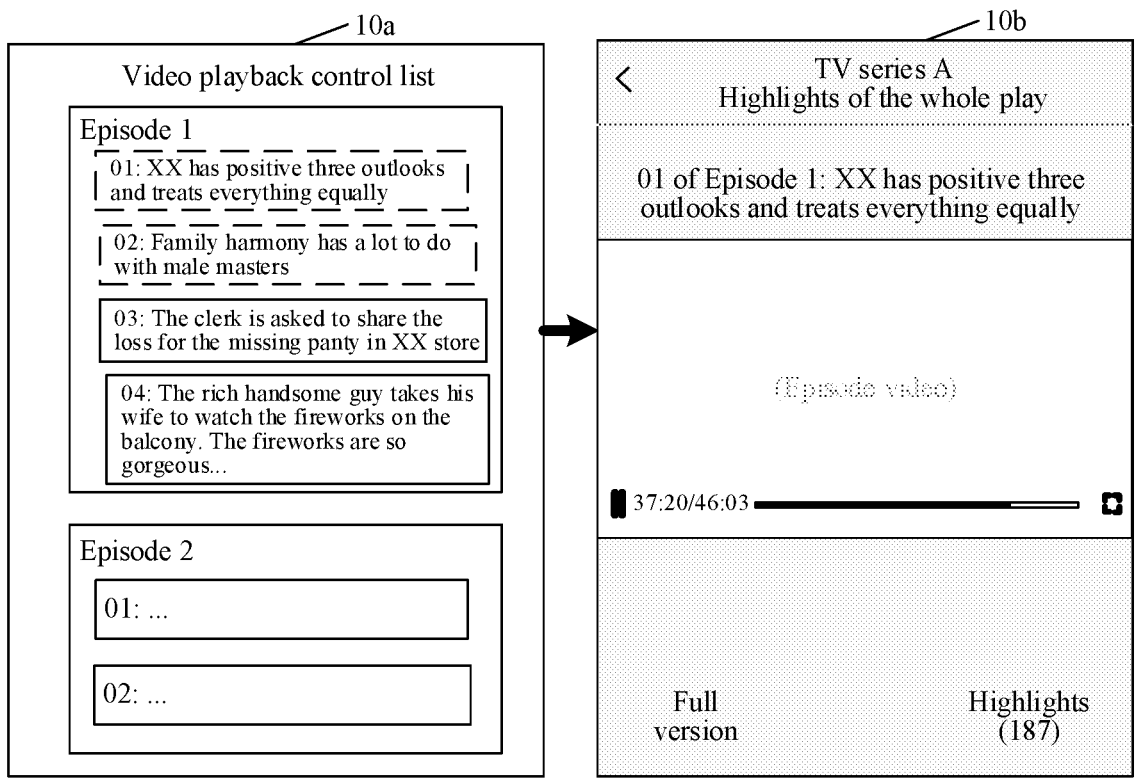
FIG. 10 is a schematic diagram of controlling playback of a video clip based on a video playback control list according to an embodiment of this application.

For example, referring to FIG. 10, a left side of FIG. 10 is a video playback control list 10*a*, and the video playback control list 10*a* includes the video clips of each episode of the TV series A. A right side is a video content currently played on a video playback interface 10*b* of the video client, which is from the video of the first episode of the TV series A. The video content is currently played to 37:20 (min:sec) of the first episode. Since the first two video clips of the first episode of TV series A, that is, "01 of Episode 1: XX has positive three outlooks and treats everything equally" and "02 of Episode 1: Family harmony has a lot to do with male masters" are contents before 37:20 (min:sec), the Played identifier is set for the two video clips in the video playback control list (as shown by a dashed-line box in FIG. 10).

In this embodiment, the Played identifier may be removed, so as to prevent a failure of switching to a video clip desired by the user by the upward sliding operation or the downward sliding operation.

In an embodiment, after the step of switching to playback of the to-be-played video clip on the video playback interface, the method may further include: in accordance with a determination that the to-be-played video clip does not match a previous video content played on the video playback interface: removing a Played identifier of a video clip of a video to which the previous video content belongs from the video playback control list.

For example, still referring to FIG. 10, when detecting an upward sliding operation performed by the user on the video playback interface during playback of a fourth video clip of the first episode of the TV series A on the video playback interface, the terminal switches to playback of the first video clip of the unplayed video clips of the second episode through the video playback interface, and removes the Played identifier from the video clip of the first episode. For example, the terminal changes an identifier value in the playback identifier field of the video clip of the first episode from 1 to 0 in the video playback control list. Therefore, when the user triggers the sliding operation on the video playback interface again, playback of the fourth video clip of the first episode can be switched to on the video playback interface.

In this embodiment, in order to achieve immediate switching of the video content on the video playback interface, a video preloading scheme is further used, which means that a video content adjacent to a video content may be loaded in advance during playback of the video content on the video playback interface.

In an embodiment, after the step of switching to playback of a target video clip through the video playback interface in response to a playback operation on the target video clip, the method may further include: determining a preset quantity of video clips adjacent to the target video clip in the order of plot development as to-be-loaded video clips; determining a video to which the target video clip belongs as a to-be-loaded video; and pre-downloading the to-be-loaded video clips and the to-be-loaded video, the pre-downloading to-be-loaded video clips and the to-be-loaded video being configured to be played on the video playback interface.

The above preset quantity may be set according to an actual need, for example, may be set to 2. The video clips adjacent to the target video clip may be video clips that precedes and/or follows the target video clip in the order of plot development. Since viewing habits of users are generally a chronological order, the video clips adjacent to the target video clip may be a preset quantity of (for example, 2) video clips that follow the target video clip in the order of plot development.

After determining the to-be-loaded video clips and the to-be-loaded videos, the terminal may acquire, based on any one of the two lists in this embodiment, identification information of the to-be-loaded video clips and the to-be-loaded video, such as a download link, and then download the identification information of the to-be-loaded video clips and the to-be-loaded video from the server based on the identification information.

When downloading the to-be-loaded video, the terminal may start downloading from video content that follows the target video clips.

In this embodiment, during switching of playback of video content on the video playback interface, a next to-be-loaded video content is from the pre-downloaded to-be-loaded video clips or the pre-downloaded to-be-loaded video, and video playback is switched on the video playback interface based on the pre-downloaded to-be-loaded video clip or the pre-downloaded to-be-loaded video.

In the method of this embodiment, the current video can be played through the video playback interface of the terminal, the playback start time of the target video is determined in accordance with a determination that the current video is the video clip in the target video, and the target video is played on the video playback interface starting from the playback start time of the target video in accordance with a determination that the video playback switching condition is satisfied. In this way, video playback can be switched conveniently, which effectively improves the operation convenience during the video playback. The user can switch from the short video to the long video to which the short video belongs for watching in the video client, which helps guide consumption by the user for the long video switched from the short video clip, thereby increasing the user stickiness and the use time of the video client. In addition, through the pre-download solution, the speed of switching on the video playback interface can be improved, bringing the user visual experience of immediate replacement. In addition, the setting of the video playback control list can help the user skip the video clip that has been watched, which helps resolve the problem of repeated watching, thereby bringing the user more desirable video watching experience.

This application further provides an application scenario, in which the above video playback method is applied to play various video contents. The user may acquire the video contents through the corresponding terminal, and play the corresponding videos on the video playback interface of the terminal. Specifically, applications that can play videos, such as a video application, an instant messaging application, or a video sharing program may be deployed in the terminal. Alternatively, videos may be performed through a subprogram in a parent application. For example, the parent application may be an instant messaging application, and the subprogram in the parent application may be a video sharing subprogram in the instant messaging application.

Specifically, the terminal may run an application program deployed in the terminal to display the video playback interface. The terminal may alternatively access a corresponding video website through a browser deployed in the terminal to display the video playback interface. Specifically, the user may display the video playback interface through the corresponding terminal, and the user may select a video allowing playback on the video playback interface, so that the terminal plays the selected current video on the video playback interface. During the playback of the current video, if the terminal detects that the current video is the video clip in the target video and the video playback switching condition is satisfied, the terminal plays the target video on the video playback interface starting from the playback start time of the target video.

For example, when detecting that the current video is the video clip in the target video, the terminal may display the video switching widget corresponding to the target video on the video playback interface. The video switching widget is configured to instruct to play the target video. The user may trigger a clicking/tapping operation on the video switching widget, so that the terminal switches the current video to the target video, and plays the target video on the video playback interface starting from the playback start time of the target video. In this way, video playback can be switched conveniently, which effectively improves the operation convenience during the video playback, thereby effectively reducing the operation costs for the user.

Although the steps in the flowcharts of the embodiments are displayed sequentially according to instructions of arrows, these steps are not necessarily performed sequentially according to a sequence instructed by the arrows. Unless clearly specified in this specification, there is no strict sequence limitation on the execution of the steps, and the steps may be performed in another sequence. In addition, at least some steps in the foregoing embodiments may include a plurality of steps or a plurality of stages. The steps or the stages are not necessarily performed at the same moment, but may be performed at different moments. The steps or the stages are not necessarily performed in sequence, but may be performed in turn or alternately with another step or at least some of steps or stages of the another step.

Figure 11:
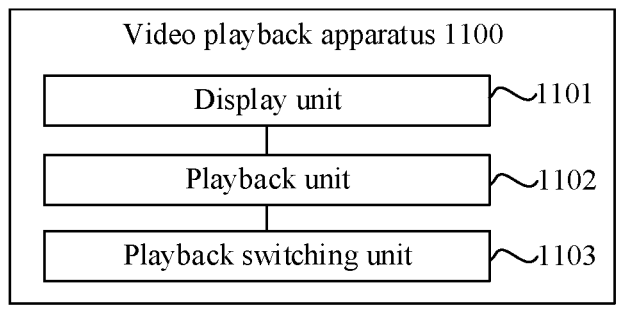
FIG. 11 is a schematic structural diagram of a video playback apparatus according to an embodiment of this application.

In order to implement the above method more effectively, an embodiment of this application further provides a video playback apparatus 1100. Referring to FIG. 11, the video playback apparatus includes: a display unit 1101, a playback unit 1102, and a playback switching unit 1103.

The display unit 1101 is configured to display a video playback interface.

The playback unit 1102 is configured to play a current video on the video playback interface.

The playback switching unit 1103 is configured to, in accordance with a determination that the current video is a video clip in the target video and a video playback switching condition is satisfied, play a target video on the video playback interface starting from a playback start time of the target video.

In an embodiment, the above video playback apparatus further includes a determining unit configured to: in accordance with a determination that the current video is a video clip in the target video: determine a playback start time of the target video; and in accordance with a determination that the video playback switching condition is satisfied: play the target video on the video playback interface starting from the playback start time.

In an embodiment, the determining unit is further configured to, in accordance with a determination that the current video is the video clip in the target video: determine a playback start time point of the current video in the target video and determine the playback start time point of the current video in the target video as the playback start time of the target video; and in accordance with a determination that the video playback switching condition is satisfied: play the target video on the video playback interface starting from the playback start time of the target video in response to the end of the playback of the current video.

In an embodiment, the determining unit is further configured to, in accordance with a determination that the current video is the video clip in the target video and the video playback switching condition is satisfied: determine a time point in the target video corresponding to an actual playback time point of the current video as the playback start time of the target video.

In an embodiment, the playback switching unit is further configured to: display a video switching widget corresponding to the target video on the video playback interface in accordance with a determination that the current video is the video clip in the target video and the video playback switching condition is satisfied; and play the target video on the video playback interface starting from the playback start time of the target video in response to a trigger operation on the video switching widget.

In an embodiment, the above video playback apparatus further includes a video switching unit configured to switch to playback of a video clip of an associated video of the target video on the video playback interface in accordance with a determination that the video playback switching condition is satisfied, the associated video being associated with the target video.

In an embodiment, the above video playback apparatus further includes a list switching video unit configured to: display a video list corresponding to the target video in response to a video list display operation on the video playback interface, the video list including at least one video clip of the target video and the associated video of the target video, the at least one video clip being arranged according to an order of plot development in the video to which the video clip belongs; and; and switch to playback of a target video clip on the video playback interface in response to a playback operation on the target video clip in the video list.

In an embodiment, the list switching video unit is further configured to display an episode selection floating layer on the video playback interface in response to a preset sliding operation on the video playback interface the video list of the target video being displayed on the episode selection floating layer.

In an embodiment, the video playback interface includes a video list display widget; and the list switching video unit is further configured to display an episode selection floating layer on the video playback interface in response to a trigger operation on the video list display widget, the video list corresponding to the target video being displayed on the episode selection floating layer.

In an embodiment, the list switching video unit is configured to: transmit a list data acquisition request to a server in response to the video list display operation on the video playback interface, the list data acquisition request including a video identifier of the target video; receive video list data transmitted by the server in response to the list data acquisition request, the video list data including description information and information about the order of plot development of the at least one video clip of the target video and the associated video of the target video, the video list data being generated by the server based on attribute information of a candidate video clip, and the attribute information including a video to which the candidate video clip belongs and position information of the candidate video clip in the video; and display, based on the video list data, the video list corresponding to the target video.

In an embodiment, the playback switching unit is further configured to: display a playback mode selection widget on the video playback interface in accordance with a determination that the playback of the current video playback ends, the playback mode selection widget including a video clip continuous-playback sub-widget and a video playback sub-widget; play, through the video playback interface, a video clip that follows the target video among the video clips of the target video and the associated video of the target video in accordance with a determination that a selection operation on the video clip continuous-playback sub-widget is detected; and play the target video on the video playback interface starting from the playback start time of the target video, in accordance with a determination that a selection operation on the video playback sub-widget is detected.

In an embodiment, the playback switching unit is further configured to: display preset video playback prompt information through the video playback interface in response to the end of the playback of the current video, the preset video playback prompt information being used for prompting that the target video to which the current video belongs is about to be played; and play the target video on the video playback interface starting from the playback start time of the target video in accordance with a determination that a display duration of the preset video playback prompt information reaches a preset display duration threshold.

In an embodiment, the above video playback apparatus further includes a playback mode control unit configured to: display a playback control widget on the video playback interface in response to a display operation on the playback control widget on the video playback interface, the playback control widget including a playback mode switching widget; switch a playback mode of the video playback interface to a landscape mode in response to a trigger operation on the playback mode switching widget in accordance with a determination that a current playback mode of the video playback interface is a portrait mode; and switch the playback mode of the video playback interface to the portrait mode in response to a trigger operation on the playback mode switching widget in accordance with a determination that the current playback mode of the video playback interface is the landscape mode.

In an embodiment, the video playback apparatus further includes a playback control list unit configured to: acquire a video playback control list of the video playback interface in response to a video-clip-switching sliding operation on the video playback interface, the video playback control list including at least one video clip of the target video and an associated video of the target video, the at least one video clip being arranged according to an order of plot development in the video to which the video clip belongs, and a Played identifier being set for a played video clip in the video playback control list; determine, based on a video switching direction of the video-clip-switching sliding operation, an order between a to-be-played video clip and a video content currently played on the video playback interface in terms of plot development; select, based on the order and the video playback control list, a to-be-played video clip from video clips for which the Played identifier is not set; and switch to playback of the to-be-played video clip on the video playback interface, and set, in the video playback control list, the Played identifier for the to-be-played video clip.

In an embodiment, the video playback apparatus further includes a Played identifier removal unit configured to remove, after the playback of the to-be-played video clip on the video playback interface is switched to, a Played identifier of a video clip of a video to which a previous video content belongs from the video playback control list in accordance with a determination that the to-be-played video clip does not match a previous video content played on the video playback interface.

In an embodiment, the video playback apparatus further includes a preloading unit configured to: determine, from the target video and the video clip of the associated video of the target video, a preset quantity of video clips adjacent to the target video clip in the order of plot development as to-be-loaded video clips after the list switching video unit switches to playback of the target video clip through the video playback interface in response to the playback operation on the target video clip; determine a video to which the target video clip belongs as a to-be-loaded video; and pre-download the to-be-loaded video clips and the to-be-loaded video, the pre-downloading to-be-loaded video clips and the to-be-loaded video being configured to be played on the video playback interface.

According to the video playback apparatus of this embodiment, the video playback interface can be displayed through the video client, and the current video can be played on the video playback interface; the playback start time of the target video is determined in accordance with a determination that the current video is the video clip in the target video, and the target video is played on the video playback interface starting from the playback start time of the target video in accordance with a determination that the video playback switching condition is satisfied. In this way, the user can switch from the short video to the long video to which the short video belongs for watching in the video client, which helps guide consumption by the user for the long video switched from the short video clip, thereby increasing the user stickiness and the use time of the video client.

In an embodiment, a computer device is provided. The computer device may be a terminal, and an internal structure diagram thereof may be shown in FIG. 12. The computer device includes a processor, a memory, a communication interface, a display screen, and an input apparatus that are connected by using a system bus. The processor of the computer device is configured to provide computing and control capabilities. The memory of the computer device includes a non-transitory non-volatile storage medium and an internal memory. The non-transitory non-volatile storage medium stores an operating system and a computer program. The internal memory provides an environment for running of the operating system and the computer program in the non-transitory non-volatile storage medium. The communication interface of the computer device is configured to communicate with an external terminal in a wired or wireless manner. The wireless communication may be implemented by WIFI, an operator network, NFC (Near Field Communication), or other technologies. The computer program, when executed by the processor, implementing the video playback method. The display screen of the computer device may be a liquid crystal display or an electronic ink display screen. The input apparatus of the computer device may be a touch layer that overlays the display screen, or may be a key, a trackball, or a touchpad disposed on the chassis of the computer device, or may be an external keyboard, touchpad or mouse or the like.

Figure 12:
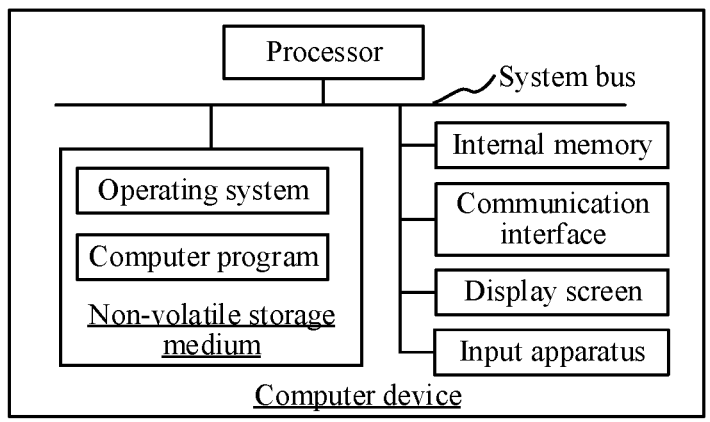
FIG. 12 is a schematic structural diagram of a computer device according to an embodiment of this application.

A person skilled in the art may understand that, the structure shown in FIG. 12 is only a block diagram of a part of a structure related to a solution of this application and does not limit the computer device to which the solution of this application is applied. Specifically, the computer device may include more or fewer members than those in the drawings, or include a combination of some members, or include different member layouts.

An embodiment further provides a computer device, including a memory and a processor, where the memory stores a computer program; and when executing the computer program, the processor performs the steps in the foregoing method embodiments.

An embodiment provides a non-transitory computer-readable storage medium storing a computer program. The computer program, when executed by a processor, performs the steps of the foregoing method embodiments.

In an embodiment, a computer program product or a computer program is provided. The computer program product or the computer program includes a computer instruction. The computer instruction is stored in a non-transitory computer-readable storage medium. The processor of the computer device reads the computer instruction from the non-transitory computer-readable storage medium. The processor executes the computer instruction to cause the computer device to perform the steps of the method embodiments.

A person skilled in the art may understand that all or part of the steps in the various methods of the foregoing embodiments may be completed by using the computer-readable instruction or completed by using the instruction to control related hardware. The computer-readable instruction may be stored in a non-transitory computer-readable storage medium, loaded and executed by the processor. When being executed, the computer-readable instruction may include the processes of the embodiments of the foregoing embodiments. The non-transitory storage medium may include: a read-only memory (ROM), a random access memory (RAM), a magnetic disk, an optical disc or the like.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Because the instructions stored in the non-transitory storage medium may perform the steps of the video playback method in the embodiments of this application, the instructions can achieve beneficial effects that may be achieved by the video playback method in the embodiments of this application. For details, refer to the foregoing embodiments. The video playback method and apparatus, the computer device, and the non-transitory storage medium provided in the embodiments of this application are described above in detail. The principles and the implementations of this application are illustrated by using specific examples. The description of the above embodiments is merely used for facilitating understanding of the method of this application and the core ideas thereof. Meanwhile, a person skilled in the art may make modifications to the specific implementations and application scopes according to the ideas of this application. In conclusion, the content of the specification is not to be construed as a limitation to this application.

What is claimed is:

1. A video playback method, performed by a computing device, the method comprising:
displaying a video playback interface;
playing a current video on the video playback interface, wherein the current video is a first video clip, which is a first portion of a target video and the target video is a first episode of a series of video episodes;
in response to a video list display operation on the video playback interface:
displaying a video list on the video playback interface, the video list comprising (i) a second video clip, which is a second portion of the target video that is behind the first video clip by a predefined duration in the target video and (ii) a third video clip, which is a third portion of a second video episode subsequent the target video within the series of video episodes, the second video clip and the third video clips being arranged according to a chronological order of plot development in the target video and the video subsequent the target video among the series of video episodes, wherein the first video clip, the second video clip and the third video clip are respective highlights in the first video episode and the second video episode;
in accordance with a determination that a full version play mode has been activated and an end of the playback of the first video clip is reached:
playing the target video on the video playback interface starting from the end of the playback of the first video clip until an end of the target video;
switching from the full version play mode to a highlight play mode; and
starting playing the third video clip in the video list on the video playback interface at the end of playing the target video.

2. The video playback method according to claim 1, wherein playing the target video comprises:
in accordance with a determination that the current video is the video clip corresponding to the portion of the target video:
determining the playback start time of the target video; and
in accordance with a determination that the video playback switching condition is satisfied:
playing the target video on the video playback interface starting from the playback start time.

3. The video playback method according to claim 2, wherein determining the playback start time of the target video comprises:
in accordance with a determination that the current video is the video clip corresponding to the portion of the target video:
determining a playback end time point of the current video in the target video and determining the playback end time point of the current video in the target video as the playback start time of the target video.

4. The video playback method according to claim 2, wherein determining the playback start time of the target video comprises:
in accordance with a determination that the current video is the video clip corresponding to the portion of the target video and the video playback switching condition is satisfied:
determining a time point in the target video corresponding to an actual playback time point of the current video as the playback start time of the target video.

5. The video playback method according to claim 1, wherein playing the target video on the video playback comprises:
in accordance with a determination that the current video is the video clip corresponding to the portion of in the target video and the video playback switching condition is satisfied:
displaying a video switching widget corresponding to the target video on the video playback interface; and
playing the target video on the video playback interface starting from the playback start time of the target video in response to a trigger operation on the video switching widget.

6. The video playback method according to claim 1, wherein after playing the target video on the video playback interface starting from the playback start time of the target video, the method further comprises:
in accordance with a determination that the video playback switching condition is satisfied:
switching to playback of a video clip of a video of associated with the target video on the video playback interface.

7. The video playback method according to claim 1, wherein displaying the video list comprises:
in response to a preset sliding operation on the video playback interface:
displaying an episode selection floating layer on the video playback interface, the video list corresponding to the target video being displayed on the episode selection floating layer.

8. The video playback method according to claim 1, wherein the video playback interface comprises a video list display widget; and displaying the video list corresponding to the target video comprises:
in response to a trigger operation on the video list display widget:
displaying an episode selection floating layer on the video playback interface, the video list corresponding to the target video being displayed on the episode selection floating layer.

9. The video playback method according to claim 1, wherein displaying the video list corresponding to the target video comprises:
in response to the video list display operation on the video playback interface:
transmitting a list data acquisition request to a server, the list data acquisition request comprising a video identifier of the target video;
in response to the list data acquisition request:
receiving video list data transmitted by the server, the video list data comprising description information and information about the order of plot development in the at least one video clip of the target video and the video subsequent the target video, the video list data being generated by the server based on attribute information of a candidate video clip, and the attribute information comprising a video to which the candidate video clip belongs and position information of the candidate video clip in the video; and
displaying, based on the video list data, the video list corresponding to the target video.

10. The video playback method according to claim 1, further comprising:
displaying a playback control widget on the video playback interface in response to a display operation on the playback control widget on the video playback interface, the playback control widget comprising a playback mode switching widget;
in response to a trigger operation on the playback mode switching widget:
in accordance with a determination that a current playback mode of the video playback interface is a portrait mode:
switching a playback mode of the video playback interface to a landscape mode; and
in accordance with a determination that the current playback mode of the video playback interface is the landscape mode:
switching the play back mode of the video playback interface to the portrait mode.

11. The video playback method according to claim 1, wherein after playing the target video on the video playback interface starting from a playback start time of the target video, the method further comprises:
in response to a video-clip-switching sliding operation on the video playback interface:
acquiring a video playback control list of the video playback interface, the video playback control list comprising at least one video clip of the target video and the video subsequent the target video, the at least one video clip being arranged according to an order of plot development in the target video, and an identifier indicating a video clip has been played in the video playback control list;
determining, based on a video switching direction of the video-clip-switching sliding operation, an order between a to-be-played video clip and a video content currently played on the video playback interface in terms of plot development;
selecting, based on the order and the video playback control list, a to-be-played video clip from video clips for which the identifier has not been set; and
switching to playback of the to-be-played video clip on the video playback interface, and setting, in the video playback control list, the identifier for the to-be-played video clip.

12. The video playback method according to claim 11, wherein after switching to playback of the to-be-played video clip on the video playback interface, the method further comprises:
in accordance with a determination that the to-be-played video clip does not match a previous video content played on the video playback interface:
removing the identifier of a video clip of a video to which the previous video content belongs from the video playback control list.

13. An electronic device, comprising:
one or more processors; and
memory storing one or more programs, the one or more programs comprising instructions that, when executed by the one or more processors, cause the one or more processors to perform operations comprising:
displaying a video playback interface;
playing a current video on the video playback interface, wherein the current video is a first video clip, which is a first portion of a target video and the target video is a first episode of a series of video episodes;
in response to a video list display operation on the video playback interface:
displaying a video list on the video playback interface, the video list comprising (i) a second video clip, which is a second portion of the target video that is behind the first video clip by a predefined duration in the target video and (ii) a third video clip, which is a third portion of a second video episode subsequent the target video within the series of video episodes, the second video clip and the third video clips being arranged according to a chronological order of plot development in the target video and the video subsequent the target video among the series of video episodes, wherein the first video clip, the second video clip and the third video clip are respective highlights in the first video episode and the second video episode;
in accordance with a determination that a full version play mode has been activated and an end of the playback of the first video clip is reached:
playing the target video on the video playback interface starting from the end of the playback of the first video clip until an end of the target video;
switching from the full version play mode to a highlight play mode; and
starting playing the third video clip in the video list on the video playback interface at the end of playing the target video.

14. The electronic device according to claim 13, wherein playing the target video comprises:
in accordance with a determination that the current video is the video clip corresponding to the portion of the target video:
determining the playback start time of the target video; and
in accordance with a determination that the video playback switching condition is satisfied:
playing the target video on the video playback interface starting from the playback start time.

15. The electronic device according to claim 13, wherein playing the target video on the video playback comprises:
in accordance with a determination that the current video is the video clip corresponding to the portion of in the target video and the video playback switching condition is satisfied:
displaying a video switching widget corresponding to the target video on the video playback interface; and
playing the target video on the video playback interface starting from the playback start time of the target video in response to a trigger operation on the video switching widget.

16. The electronic device according to claim 13, wherein after playing the target video on the video playback interface starting from the playback start time of the target video, the method further comprises:
in accordance with a determination that the video playback switching condition is satisfied:
switching to playback of a video clip of a video of associated with the target video on the video playback interface.

17. A non-transitory computer-readable storage medium, storing a computer program, the computer program, when executed by one or more processors of an electronic device, cause the one or more processors to perform operations comprising:
displaying a video playback interface;
playing a current video on the video playback interface, wherein the current video is a first video clip, which is a first portion of a target video and the target video is a first episode of a series of video episodes;

in response to a video list display operation on the video playback interface:
  displaying a video list on the video playback interface, the video list comprising (i) a second video clip, which is a second portion of the target video that is behind the first video clip by a predefined duration in the target video and (ii) a third video clip, which is a third portion of a second video episode subsequent the target video within the series of video episodes, the second video clip and the third video clips being arranged according to a chronological order of plot development in the target video and the video subsequent the target video among the series of video episodes, wherein the first video clip, the second video clip and the third video clip are respective highlights in the first video episode and the second video episode;
in accordance with a determination that a full version play mode has been activated and an end of the playback of the first video clip is reached:
  playing the target video on the video playback interface starting from the end of the playback of the first video clip until an end of the target video;
  switching from the full version play mode to a highlight play mode; and
  starting playing the third video clip in the video list on the video playback interface at the end of playing the target video.

18. The non-transitory computer-readable storage medium according to claim 17, wherein playing the target video comprises:
  in accordance with a determination that the current video is the video clip corresponding to the portion of the target video:
    determining the playback start time of the target video; and
  in accordance with a determination that the video playback switching condition is satisfied:
    playing the target video on the video playback interface starting from the playback start time.

19. The non-transitory computer-readable storage medium according to claim 17, wherein playing the target video on the video playback comprises:
  in accordance with a determination that the current video is the video clip corresponding to the portion of in the target video and the video playback switching condition is satisfied:
  displaying a video switching widget corresponding to the target video on the video playback interface; and
  playing the target video on the video playback interface starting from the playback start time of the target video in response to a trigger operation on the video switching widget.

* * * * *